United States Patent [19]
Taner et al.

[11] 4,363,113
[45] Dec. 7, 1982

[54] SEISMIC EXPLORATION WITH SIMULATED PLANE WAVES

[75] Inventors: Mehmet T. Taner, Houston, Tex.;
Fulton Koehler, Minneapolis, Minn.;
Nigel A. Anstey, Kent, England;
Michael J. Castelberg, Houston, Tex.

[73] Assignee: Seiscom Delta, Inc., Houston, Tex.

[21] Appl. No.: 548,572

[22] Filed: Feb. 10, 1975

[51] Int. Cl.$^3$ .......................... G01V 1/28; G01V 1/38
[52] U.S. Cl. ........................................ 367/63; 367/21;
367/40; 367/61; 364/421
[58] Field of Search .............. 340/15.5 CP, 15.5 MC,
340/7 R; 367/21, 40, 56, 61, 63; 364/421

[56] References Cited
U.S. PATENT DOCUMENTS

| | | | |
|---|---|---|---|
| 2,555,806 | 6/1951 | Mitchell, Jr. ................ | 340/15.5 CP |
| 2,923,366 | 2/1960 | Meiners et al. .............. | 340/15.5 CP |
| 3,096,846 | 7/1963 | Savit et al. ................. | 340/15.5 MC |
| 3,256,501 | 6/1966 | Smith, Jr. ................... | 340/7 R |
| 3,691,529 | 9/1972 | Pizante ....................... | 340/15.5 MC |
| 3,775,737 | 11/1973 | Laurent ....................... | 340/7 R |
| 3,921,125 | 11/1975 | Miller ......................... | 340/72 R |

OTHER PUBLICATIONS
"High Pressure Transducer," Miller Technical Report, GTE Sylvania, 10 Jan. 73, Prepared for O.N.R.
*Wave Equation Synthesis and Inversion of Diffracted Multiple Seismic Reflections,* Don C. Riley, Doctoral Dissertation in Geophysics, Stanford University, Oct. 1974.

*Primary Examiner*—Nelson Moskowitz
*Attorney, Agent, or Firm*—Pravel, Gambrell, Hewitt, Kirk & Kimball

[57] ABSTRACT

A method of seismic exploration by which substantially plane or substantially cylindrical seismic energy waves are simulated by combining reflectional signal traces of conventional spherical seismic waves. Seismic sources and receivers are established in sets at positions such that at least one of the sets includes a plurality of positions spaced over an extent of the area being explored having either one or two dimensions which are large relative to a seismic energy wavelength. Seismic energy is imparted into the earth from the sources and signals are generated in response to seismic energy received at the receivers. The generated signals are then combined into a form simulating the reflection response of the earth to seismic energy having a substantially continuous wavefront in either one dimension, simulating a cylindrical seismic energy wave, or two dimensions, simulating a plane seismic wave.

28 Claims, 20 Drawing Figures

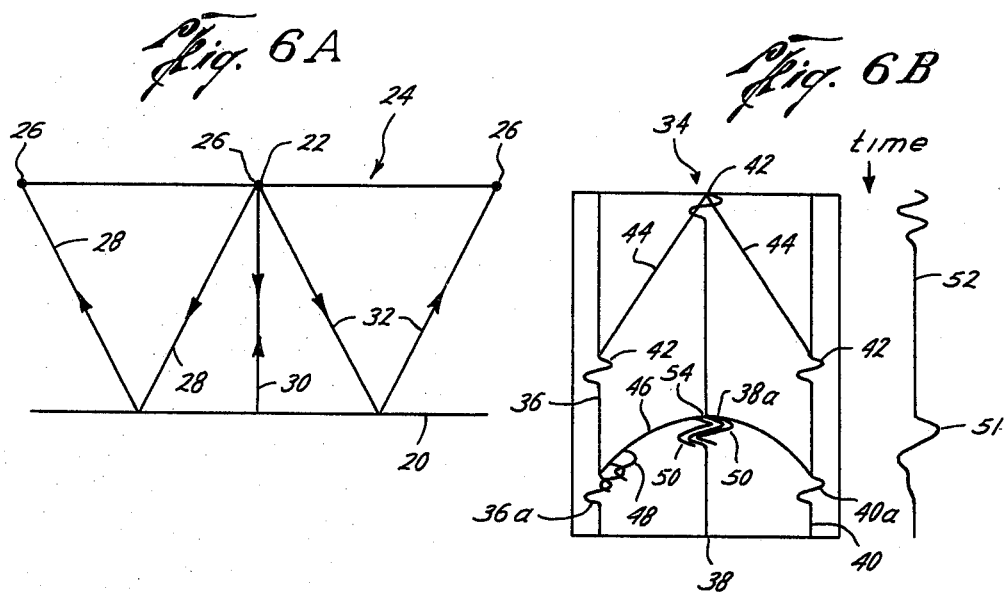
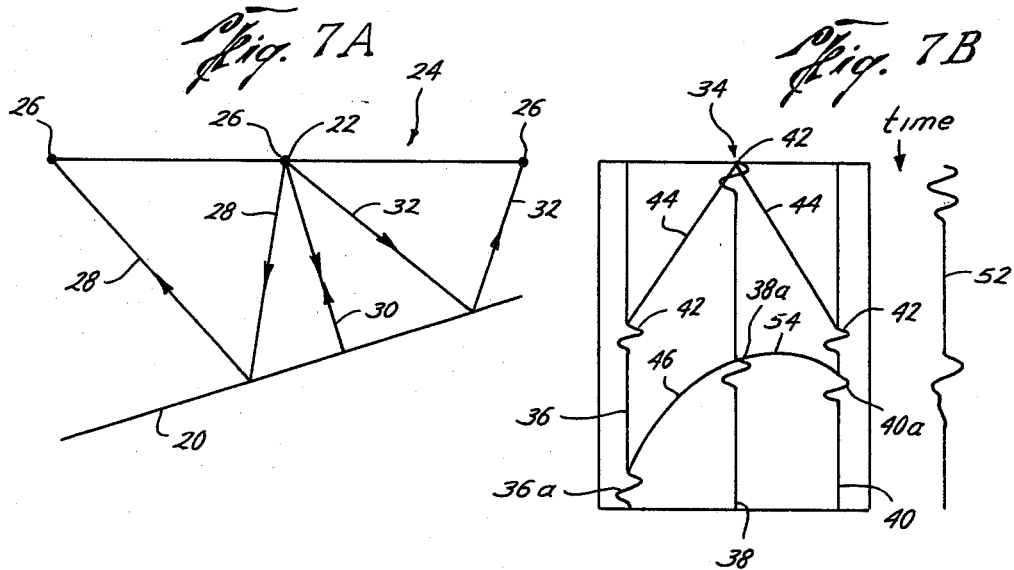
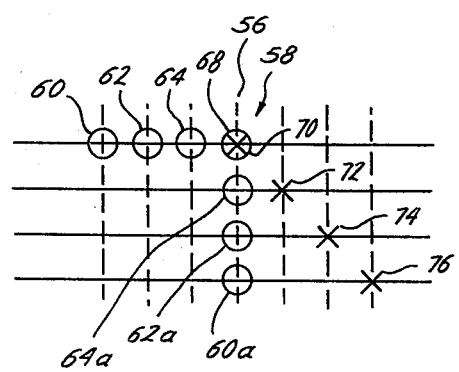

SEISMIC EXPLORATION WITH SIMULATED PLANE WAVES

BACKGROUND OF THE INVENTION

The field of this invention is seismic exploration.

With known seismic exploration methods, seismic sources were used to impart into the earth seismic energy waves which propagated through the earth in spherical or near-spherical wavefronts. Reflections of the spherical waves were detected at one or more seismic detectors, and the detected signals were recorded. The recorded signals which contained information concerning the geological substrata explored were subsequently processed in an effort to make that information more discernible. There were, however, several problems associated with the use of spherical waves and the signal processing techniques.

SUMMARY OF THE INVENTION

It is an object of this invention to provide a new and improved method of seismic exploration.

With the present invention, a source of substantially plane waves or substantially cylindrical waves is simulated. A set of source positions and a set of receiver positions are established such that at least one of the sets includes a plurality of positions spaced over an extent having at least one dimension which is large relative to a seismic energy wavelength. By combining the seismic signals derived at one receiver position from a plurality of source positions or by the reciprocal process of combining the signals derived at a plurality of receiver positions from one source position, a combined signal is obtained which represents the response of the earth to a substantially continuous wavefront over an extension of the source or receiver positions at least one of whose dimensions is large with respect to the wavelength of the seismic energy. Thus, although sources of substantially spherical waves are employed, a combined signal representing the reflection response of the earth to a downwardly traveling plane or cylindrical wave having vertical raypaths is obtained.

The combining of signals to simulate plane or cylindrical waves makes it possible to obtain a significant part of the signal-to-noise advantages of multiple coverage without the need for normal moveout correction or common depth point stacking. A source-spread arrangement is repeated many times along a profile to be traversed with the spacing of the successive source positions as an appropriate submultiple of the spread length. The plurality of reflection signals obtained for each source position are combined so that a single combined signal is derived for each source position. Accordingly, the combining of signals not only eliminates the need for normal moveout correction or common depth point stacking while retaining a significant part of the signal-to-noise advantages of multiple coverage, but it also significantly reduces the volume of data which must be handled in subsequent signal processing, thereby reducing the expenditures of time and money required for seismic exploration.

According to one embodiment of the present invention, such expenditures are even further reduced by reducing the number of channels utilized in the seismic explorations. With known seismic exploration methods the number of channels required was typically equal to the number of detector arrays utilized. However, the present invention permits the establishment of sequences of detector arrays with the signals generated by each detector array sequence being conveyed to a recorder by a single pair of conductors. The number of channels required with the present invention is, therefore, equal to the number of detector array sequences. This reduced number of channels permits the spread cables to be much lighter, the recording instruments to be much reduced in complexity, and a reduction in cost for the equipment and recording tapes.

The vertical orientation of the down-going ray paths is also of benefit. This vertical orientation ensures that multiple reflections and reverberations generated between horizontal interfaces retain constant periodicity on that component of the path and that paths through near surface geological formations, including permafrost layers, are vertical so that the problems associated with non-vertical paths in reverberating systems and in permafrost zones are reduced.

Additionally, the present invention includes a method of migration utilizing the constraint of one component of the ray path to the vertical. Since reflection signals are combined to represent the reflection response of the earth to a downwardly traveling wave having vertical ray paths, there is no significant component of the combined signal attributable to downgoing ray paths which are not vertical. The upcoming ray paths are vertical, of course, only if the reflector is horizontal. Otherwise, the upcoming ray paths are always inclined to the vertical and always pass through the source position to which the combined signal is assigned. Therefore, the locus of possible reflecting points, for a fixed length reflection path, is a parabola. Accordingly, two dimensional migration is effected by summing a plurality of combined signals along a curve of generally parabolic form, and three dimensional migration is effected by summing a plurality of combined signals over a surface of generally paraboloidal form.

The constraint of one component of the ray path to the vertical also reduces the usual discrepancies between stacking velocities, r.m.s. velocities, average velocities, and migration velocities. Since these velocities are identical for vertical ray paths through horizontal interfaces, the constraint of one component of the ray path to the vertical reduces the difference between the respective velocities.

The present invention also includes a method of computing velocities from the simulated plane wave or cylindrical wave signals. For each of a range of velocities and travel times, the normal moveout for each source-receiver distance represented in the simulated signal is computed. A velocity correlation signal is then constructed by erecting a spike or other pulse at each calculated value of normal moveout. Thereafter, the correlation coefficient between the velocity correlation signal and the simulated seismic signal is computed, and the velocity which yields the maximum cross-correlation coefficient is identified as a function of travel time. The velocity thus obtained is the true r.m.s. velocity and is not dependent upon the dip of the reflector, as are most r.m.s. velocities calculated by traditional methods.

The present invention also has advantageous features concerning the measurement of dip. A plane wave reflected from a plane reflector remains plane. Therefore, the usual relationship between dip angle, velocity, and emergence angle is exact with the present invention, rather than being an approximation as in the case with known seismic methods. While steel dips are not detectable using horizontally oriented wavefronts, time shifts may be applied to the original reflection signals. The time shifts progressively increase, positively in one direction and negatively in the other direction, away from the surface position to which a combined signal is assigned. In this manner, the combined signal represents the reflection response to a downgoing plane or cylindrical wavefront which is inclined to the vertical so that steep reflector dips may be detected.

It should be further noted that the seismic explorations conducted according to the present invention are relatively insensitive to surface waves and refracted signals having substantially uniform velocities and accelerations through the earth provided that the spread arrangement used is such that adjacent receiver arrays almost touch. When the individual seismic detectors are evenly spaced across such a spread, the spread approximates one continuous array and is, therefore, relatively insensitive to such surface and refracted signals.

BRIEF DESCRIPTION OF THE DRAWINGS

FIG. 6A illustrates a seismic reflection situation with a horizontal reflector.

FIG. 6B illustrates the seismic reflection record associated with the reflection situation of FIG. 6A and the form into which the reflection record is manipulated by the method of the present invention.

FIG. 7A illustrates a seismic reflection situation with a dipping reflector.

FIG. 7B illustrates the seismic reflection record associated with the reflection situation of FIG. 7A and the form into which the reflection record is manipulated by the method of the present invention.

FIG. 8 is a surface diagram illustrating how the symmetrical spread of FIGS. 6A and 7A are synthesized from multiple coverage data obtained with an end-on spread.

DETAILED DESCRIPTION OF THE PREFERRED EMBODIMENTS

Figure 1:
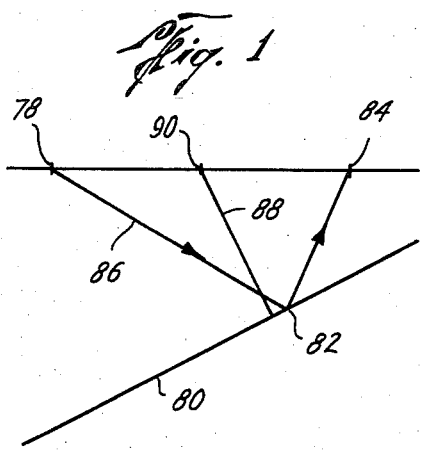
FIG. 1 illustrates a reflection path from a source to a receiver and the normal-incidence path associated with a surface point half way from the source to the receiver.
Figure 2:
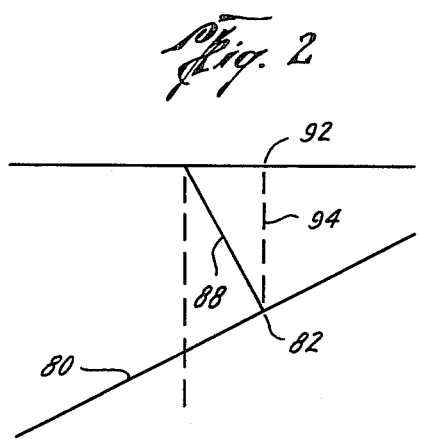
FIG. 2 illustrates the horizontal displacement of the surface point of FIG. 1 accomplished by time migration.

At the outset, it is considered helpful to discuss briefly, and also with reference to FIGS. 1-5, the analytical techniques of the prior art seismic exploration methods using spherical waves.

The spherical waves were subject to spherical divergence. As they propagated through the geological substrata, the spherical waves continually spread out, forming spherical wavefronts having continually larger radii. As a result of this geometrical spreading, the amplitude of the spherical waves descreased by an amount inversely proportional to the radius of the wavefront. Seismic source arrays were sometimes used to impart a measure of directivity to the waves in terms of amplitude and frequency content as a function of radial direction, but the wavefronts remained quite close to spherical at distances of common interest, and the energy density of the waves decreased with the distance traveled by the wave.

To reduce the effects of this decay of the spherical waves, the reflected waves were often amplitude compensated by an amount inversely proportional to the radius of curvature of the wavefront. However, this amplitude compensation created another problem: it exaggerated the amplitude of multiple reflections of the waves relative to the amplitude of primary reflections detected at the same time. Multiple reflections usually traveled a shorter distance from source to detector than did primary reflections detected at the same time because a greater portion of the propagation of the multiples was through shallower layers of geological substrata in which the effective velocity of the wavefront was typically lower. Since both multiple and primary reflections were amplitude compensated by an amount corresponding to the longer source-receiver distance traveled by the primary reflection, the compensated signals exaggerated the amplitude of the multiples.

Known seismic exploration methods required correction for normal moveout. An individual reflection originating from a spherical wave and recorded as a function of time at a surface spread of detectors had a generally hyperbolic form. The removal of this hyperbolic curvature was known as normal moveout correction. After normal moveout correction, the arrival time of a reflection as observed at any surface detector was approximately equal to the two-way normal-incidence time to the reflector from a surface point half way between the source and the detector. Subsequently, by the well known process of multiple coverage stacking, the many versions of each nominal normal-incidence path were summed to yield a stacked trace. While signal-to-noise advantages were obtained through this signal processing, the normal moveout correction was undesirable in that it involved stretching the reflection signals and distorting their frequency content. Additionally, the stacking process required determination of appropriate stacking velocities if these were not known. Problems existed of the interpolation of stacking velocities between the locations at which they were determined.

The geometry of the interfaces and ray paths has also adversely affected the use of deconvolution techniques to remove water reverberations and other multiple reflections from recorded reflections of the spherical waves. When the generating interfaces were not horizontal and/or the reverberation paths were not vertical, the reverberations were basically non-periodic and deconvolution techniques were of limited utility in removing such multiple reflections.

Migration was performed either by the common tangent method disclosed in U.S. Pat. No. 2,693,862 or by summing along a surface of maximum convexity as disclosed in Hagedoorn, *Geophysical Prospecting*, June, 1954. With both of these migration methods, reflection signals were distributed into zones where no reflection actually existed. No definition of the actual reflector could be obtained from an individual reflection of a spherical wave detected at a receiver at a given time, but a surface comprising the locus of possible reflection points for that detected reflection was definable. With the migration methods, each of a plurality of the detected reflections was distributed over a surface related to the locus of possible reflection points for the individual reflection, although it was known that reflections did not actually occur at all points along these surfaces. The distributed signals on a plurality of such surfaces associated with a given reflection time were summed, and in this summing process there was a mutual cancellation of signals distributed into zones where no reflection actually occurred. From the summed data, a definition of the actual reflector was obtainable.

FIG. 1 illustrates the general reflection situation for traditional seismic exploration methods using spherical waves. Seismic energy from a source 78 travels to a dipping reflector 80, is reflected at a reflection point 82, and travels on to a receiver 84. A basic ray path 86 generally defines the propagation of the seismic energy from source 78 to receiver 84. After normal moveout correction, the arrival time of the reflection signal at receiver 84 is approximately equal to the two-way normal-incidence travel time to reflector 80 along a normal-incidence path 88 from a source point 90 which is half way between the source 78 and the receiver 84. As can be seen from FIG. 1, generally the actual ray path 86 from source 78 to reflector 80 and back to the detector 84, as well as the nominal normal-incidence path 88, are all inclined to the vertical. The reflection point 82 is not vertically below the source 78, the detector 84, or the half way surface point 90. With known seismic exploration methods, the traditional process of time migration is applied to move the reflection indication on a seismic cross-section to a new position illustrated generally in FIG. 2. Horizontally this new position 92 conforms to that of the reflection point 82. Vertically, it represents the two-way vertical seismic travel time along a path 94 from reflection point 82 to the surface position 92. In actual practice, this two-way path 94 is not physically realizable. However, the traditional migrated reflection appears on a seismic trace assigned to the surface point 92 and at a time which represents the travel time along the rotational path 94.

Figure 3:
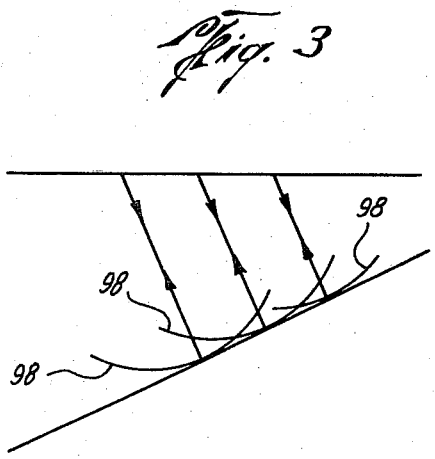
FIG. 3 illustrates generally the traditional process of migration by the common tangent method.
Figure 4:
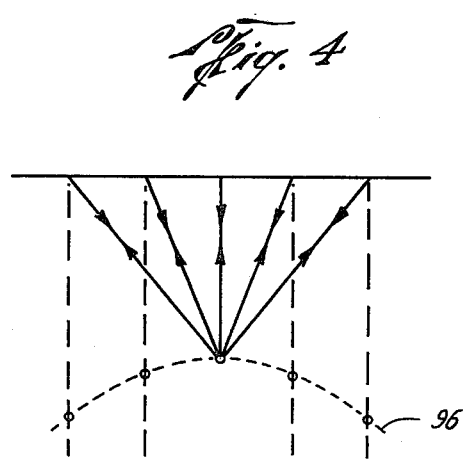
FIG. 4 illustrates generally the traditional process of migration by summing along a diffraction pattern.
Figure 5:
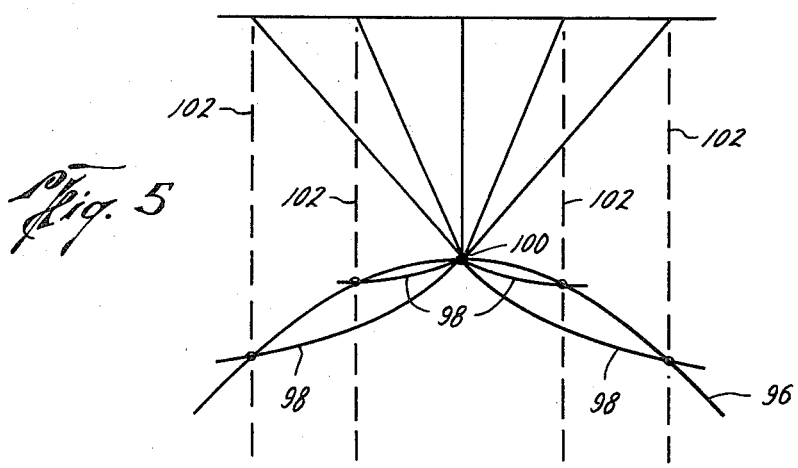
FIG. 5 illustrates generally the duality between the migration methods shown in FIGS. 3 and 4.

The traditional process of migration by the common-tangent method is illustrated generally in FIG. 3, and migration by summing along a surface of maximum convexity 96 is illustrated generally in FIG. 4. The duality between the two traditional migration methods illustrated in FIGS. 3 and 4 is shown in FIG. 5 for the basic case where the locus of possible reflection points in FIG. 3 is a circle 98, corresponding to a spherical wave front, and the corresponding surface of maximum convexity in FIG. 4 is a hyperbola 96. As shown in FIG. 5, generally each circular locus 98 intersects the hyperbolic diffraction pattern 96 twice, once at an elementary scatterer 100, and once below the surface point at which a normal-incidence path 102 terminates. The process of migration consists of moving a reflection indication from the second of the intersections to the first, along either the circular locus 98 or the hyperbolic locus 96. These migration methods distribute reflection signals along either surfaces 98 or 96 and, therefore, into zones along these paths where no actual reflection exists. The migration methods rely on mutual cancellation during summing to attenuate the signals in these zones, and this cancellation is observed to be effective in practice. However, the quantity of data which had to be processed to carry out these migration methods was quite large, making migration a time consuming and expensive process.

Similarly, large amounts of data had to be separately handled in other aspects of known seismic exploration methods. Typically, many detector channels were required, and these channels had to be handled separately all the way from the individual detector arrays through the tape recording, through gain recovery, spherical divergence compensation, and sometimes through deconvolution also, before the volume of data could be reduced by stacking. The expenditures of time and money required to handle such large amounts of data made it desirable to reduce the volume of data processed, but with known seismic exploration methods and signal processing methods, such a reduction of data typically could not be accomplished without a loss of some of the information contained in the reflected signals.

Generally, the present invention includes a method of simulating a source of substantially plane waves or substantially cylindrical waves and performing seismic explorations utilizing such a source. A set of source positions and a set of receiver positions are first established. As used herein, the term "source position" shall mean a seismic signal source, such as a conventional seismic source of substantially spherical waves, at a desired spatial position. Similarly, the term "receiver position" shall mean a receiver, such as a conventional geophone or hydrophone group, at a desired spatial position. Further, the term "set of source positions" shall mean one or more source positions, and the term "set of receiver positions" shall mean one or more receiver positions. According to the method of the present invention, at least one of the sets of source positions and receiver positions includes a plurality of positions spaced over an extent having at least one dimension which is large relative to a seismic wavelength. Seismic energy is imparted into the earth from the set of source positions, and a plurality of signals are generated by the receivers in the conventional manner in response to seismic energy received at the set of receiver positions. The generated signals are then combined and recorded in a form simulating the reflection response of the earth to a seismic wave having a substantially continuous wavefront over at least the extension of the source or receiver positions whose dimension is large relative to a seismic wavelength.

It is well known that for a source to generate substantially plane waves it must have dimensions large relative to a wavelength. Similarly, for a source to generate substantially cylindrical waves, it must be in the form of a line whose length is large relative to a wavelength. In traditional seismic exploration, the source dimensions are on the order of one wavelength at most, as are typical receiver arrays. However, the total length of the receiver spread is many times more than a seismic energy wavelength. Typically spreads include 48 or 96 individual receiver arrays, and the spreads may be 60 times the length of a seismic energy wavelength. In one form, the method of the present invention may be regarded, at least in part, as simulating cylindrical or plane waves by the use of a complete spread as a single receiver array.

Considering the invention in more detail, FIG. 6A represents a classical reflection situation in which a reflector 20 is horizontal. A source 22 is centrally located along a spread 24. A plurality of receivers are positioned along the spread 24. Three such receivers 26 are illustrated in FIG. 6A, and the central receiver is shown at the same position as source 22. Paths 28, 30, and 32 represent the basic ray paths for seismic waves from source 22 to reflector 20 and on to the three receivers 26. A seismic record 34 (FIG. 6B) represents the traces corresponding to these ray paths as a function of time. On record 34, trace 36 corresponds to ray path 28, trace 38 to ray path 30, and trace 40 to ray path 32. The general form of the first arriving signals, the refracted signals 42, take the general form indicated by line 44 on the seismic record. Reflected signals 36a, 38a, and 40a, on the other hand, take the substantially hyperbolic form of a normal moveout curve 46. It should be understood, of course, that typically spread 24 has 48 or 96 receiver arrays and there are an equal number of ray paths. However, for the sake of clarity in the drawings, only three such receivers and ray paths have been shown in FIG. 6A. Similarly, seismic record 34 would have traces equal in number to the number of receiver arrays. Reflection signals 48 and 50 corresponding to a few of the additional receivers have been shown on the record 34 for purposes of discussions set forth below.

FIG. 7A represents the same basic situation illustrated in FIG. 6A except that reflector 20 is dipping. Similarly, FIG. 7B includes a seismic record corresponding to the situation illustrated in FIG. 7A. Like numerals are used throughout FIGS. 6A, 6B, 7A, and 7B to identify corresponding elements in those figures.

Records 34 in FIGS. 6B and 7B represent the traditional seismic observations recorded from a source of spherical waves into a spread of many receiver arrays, as illustrated in FIGS. 6A and 7A. It is legitimate to apply the principle of reciprocity to the basic situations illustrated in FIGS. 6A and 7A. Application of this principle allows the interchange of source and receiver without change of the reflection signal observed. Therefore, records 34 of FIGS. 6B and 7B may be regarded as the records obtained from a receiver at the source position for successive excitation of spherical sources at each of the receiver positions.

The effect of exciting these spherical sources simultaneously instead of successively is the generation of a substantially cylindrical wave. Therefore, the simulation of the reflection response of a cylindrical wave is obtained by simple linear summation of the entire suite of traces typified by traces 36, 38, and 40. In other words, the summation along the time axis of all the traces of the seismic record 34 yields the signal which would be obtained by a single receiver at the source position following the impulse excitation of a line source having a dimension of spread 24.

A graphic illustration of a combined trace 52 obtained by such a summation is shown in FIGS. 6B and 7B. The form of the reflection pulse 51 on trace 52 is an integral version of that on the suite of traces typified by traces 36a, 38a, and 40a. The original form of the traces may be restored by simple differentiation of the output or combined trace 52. There is a significant output 51 at a time at which the tangent to curve 46 is horizontal, but little output thereafter. All of the individual reflection outputs 36a, 48, 50, 38a, and 40a are in phase with respect to hyperbola 46, but they are not in phase when considered with respect to the vertical time axis of record 34. Rather, with respect to the time axis, the reflection outputs are out of phase with each other by an amount proportional to the slope of hyperbola 46. Accordingly, when the individual reflection outputs are summed along the time axis, there is a substantial cancellation of adjacent outputs at positions along hyperbola 46 where the slope of the hyperbola is substantial and the phase differentials of adjacent signals is significant. However, there is a lesser degree of concellation of adjacent outputs near an apex 54 of the hyperbola where the slope of the hyperbola is small and the phase differentials between adjacent reflection outputs is relatively slight. For example, outputs 36a and 48 tend to cancel one another during the summation process because these outputs are significantly out of phase, but adjacent outputs 38 and 50 near apex 54 of hyperbola 46 do not drastically cancel each other because the phase differential between these latter outputs is relatively slight. Indeed, the outputs near apex 54 are additive and contribute significantly to the output of combined trace 52. It is desirable, therefore, that an individual reflection output at a small source-receiver distance be available in the individual reflection signals combined. Such reflection signals are located near the apex of curve 46 on the seismic record due to the relatively short two-way travel times associated with the small source-receiver distance. These individual reflection outputs near the apex 54 of hyperbola 46 are the reflection outputs which contribute significantly to the output on combined trace 52. However, if such a signal is not available, it may be constructed by interpolation along a suitable hyperbola from the nearest few receiver traces.

The extent of reflector 20 which is effectively-ensonified, that is, the extent of the reflector producing reflection signals which contribute significantly to the reflection output of combined trace 52, is intimately related to the curvature of hyperbola 46. Where the curvature of the hyperbola is severe, only a relatively few traces near apex 54 of hyperbola 46 contribute significantly to the reflection output on the combined trace 52. On the other hand, when the curvature of hyperbola 46 is flatter, a greater number of traces near the apex 54 of the hyperbola contribute to the output of the combined trace 52. The curvature of hyperbola 46 is, in turn, related to the velocity of the seismic waves. Seismic waves having higher velocities form flatter hyperbolic curves. Since, in general, the velocity of seismic waves increases as the seismic wave travels through deeper geological layers, the individual reflection signals from reflectors beneath reflector 20 generally form flatter hyperbolic curves. Thus, a greater extent of these lower reflectors contribute significantly to the reflection output of combined trace 52. It is desirable to have this increased number of individual reflection pulses contributing to the output of the combined trace 52 because the signal-to-noise ratio improves with an increase in the number of reflection signals contributing to output 51 of trace 52. Thus, with the simulation method of the present invention, automatic benefit of signal-to-noise ratios is taken as this effectively-ensonified extent of the reflector increases with the depth of the reflector.

For a similar reason, the ratio of primary reflections to multiple reflections on combined trace 52 is better than on individual trace 38*a* since the curvature of primary reflections is normally less than that of multiple reflections arriving at the same time. Multiple reflections generally exhibit lower velocities than do primary reflections detected at the same time because a greater portion of the propagation of the multiples is through shallower layers of geological substrata in which the effective velocity of the waves is typically lower. Accordingly, the curvature of the normal moveout curve 46 associated with the multiples is more severe than the curvature of the curve 46 associated with primary reflections. Because of this differential in the curvatures of the normal moveout curves associated with the primary and multiple reflections, the ratio of primary reflections to multiple reflections which contribute to the output on combined trace 52 is greater than that associated with an individual reflection signal such as 38*a*.

It should also be noted that the output on combined trace 52 attributable to surface waves is relatively small. Indeed, if the spread arrangement is such that adjacent arrays almost touch, the sensitivity to surface waves is very small. When the individual receivers are evenly spaced across the spread, the entire spread closely approximates one continuous array and is, therefore, relatively insensitive to surface waves.

In the standard practice of multiple coverage, the source-spread arrangement of FIGS. 6A and 7A is repeated many times along the profile traversed. The spacing between successive source positions is an appropriate submultiple of the spread length. When multiple coverage is used as a part of the present invention, one combined trace 52 is obtained for each successive source position.

Particularly for the common implementation of multiple coverage work in which a source position is occupied at every receiver position in turn, the results described above in terms of a symmetrical spread may also be obtained with an end-on spread. FIG. 8 is a simplified surface diagram of such an end-on spread. A seven trace symmetrical record centered about location 56 may be obtained from an end-on spread 58 with four receivers 60, 62, 64, and 68 if the source occupies four positions 70, 72, 74, and 76. The center and left-hand part of the symmetrical spread is obtained from the source at a position 70 imparting seismic signals into receivers at positions 60, 62, 64, and 68. The right-hand part is obtained from sources at positions 72, 74, and 76 imparting seismic energy into the receivers at positions 64*a*, 62*a*, and 60*a*, respectively (that is, at position 68).

In the situations described above, the combined trace 52 represents the output from a line source having a dimension of the symmetrical spread length. The trace 52, therefore, is the response of the earth to a substantially cylindrical wave. Clearly, areal dispositions of sources and receivers can be configured so that an equivalent trace to trace 52 is obtained for an effectively areal source of large dimensions, thus yielding a combined trace 52 representing the response of the earth to a substantially plane wave.

Because the signals derived by the method of the present invention are plane or cylindrical waves, these signals require less amplitude compensation than do the signals recorded with traditional seismic exploration methods. With the traditional methods, a seismic reflection signal was recorded from a spherical source and required amplitude compensation proportional to the radius of the wave front. Plane waves are not subject to spherical divergence as are spherical waves, and consequently require no amplitude compensation. Signals derived from cylindrical waves require compensation proportional to the square root of the radius of the wave front rather than compensation proportional to the radius of the wave front.

As is the case with known seismic exploration methods, a time migration process is useful for the signals derived by the method of the present invention. FIGS. 9-12 illustrate a migration process appropriate for signals derived according to the method of the present invention.

Figure 9:
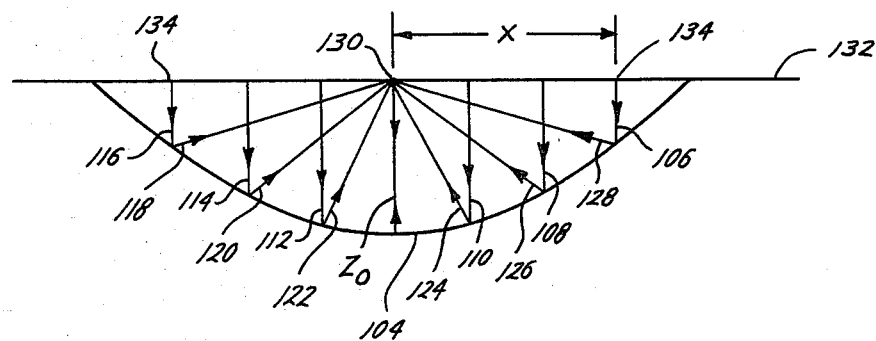
FIG. 9 illustrates the parabolic locus of possible reflection points obtained with the method of the present invention.

The simulated trace 52 illustrated in FIGS. 6B and 7B corresponds to the output from a receiver at a source location produced by a linear source over the extent of spread 24. This output of combined trace 52 is obtained by the simple summation of a suite of traces typified by traces 36, 38, and 40. The output of combined trace 52 represents, therefore, the reflection response of the earth to a downwardly traveling plane wave whose wave front is horizontal and whose ray paths are vertical. On the combined trace 52, there is no significant component generated by downgoing ray paths that are not vertical. The upcoming ray paths are vertical, of course, only if the reflector is horizontal. Otherwise, the upcoming ray path is inclined to the vertical, and always it passes through the source position to which the simulated trace 52 is assigned. Therefore, the locus of possible reflection points for a fixed length of reflection path is a parabola 104 (FIG. 9). Paths 106-116 represent typical downgoing ray paths, and paths 118-128 represent typical upcoming ray paths. The parabola 104 representing the locus of possible reflection points has its focal point at a surface position 130 which represents the surface position to which the simulated trace 52 is assigned. The parabola 104 intersects the surface 132 at angles of 45° so that reflector dips greater than 45° are not detected by the simplified situation illustrated in FIG. 9. Indeed, dips of 45° are detected by the spread of FIG. 9 only if the spread is four times as long as the focal distance $z_0$. Otherwise, the maximum detectable dip in the situation illustrated in FIG. 9 corresponds to the slope of parabola 104 at an end 134 of the spread. However, as explained in more detail hereinbelow, time shifts may be applied to traces typified by traces 36, 38, and 40 so that steeper reflector dips are detectable.

The equation of parabola 104, referred to a coordinate system having an origin at the simulated receiver point 130 is $$x^2 = 4z_0(z_0 - z). \tag{1}$$

The process of time migration by the common-tangent method, therefore, must move the reflection indication horizontally a distance x. If the medium through which the seismic waves travel permits the waves to travel along their respected ray paths with a constant velocity v, migration also moves the arrival time of the reflection indication upward along a seismic section of a new time $t_x$ which is defined by $$t_x = t_0 - \frac{x^2}{t_0 v^2} \quad (2)$$

where $t_0$ is the time of the reflection before migration.

Figure 10:
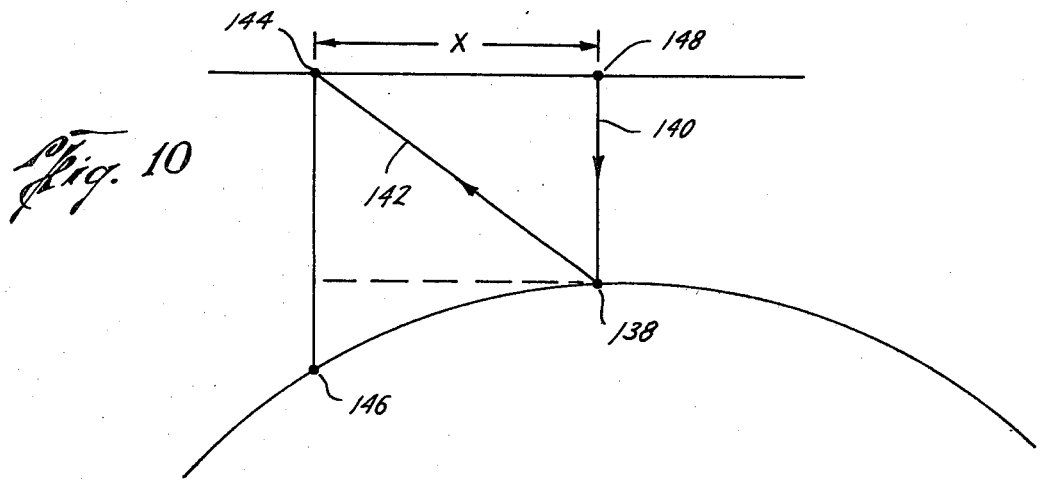
FIG. 10 illustrates the near parabolic diffraction patterns obtained with the method of the present invention.

As discussed hereinbefore with reference to FIG. 5, there is a duality between migration by the common tangent method and by summing along a diffraction pattern. FIG. 10 illustrates the form of a diffraction pattern appropriate for migration using signals derived by the method of the present invention. A scattering point 138, a simulated vertical downgoing ray path 140, and a scattered ray path 142 going to a receiver 144 are illustrated in FIG. 10. The time $t_0$ of the diffraction displayed under the receiver position 144 is indicated at 146. The two-way travel time for this diffraction is equal to the sum of the travel times along paths 140 and 142. The equation of diffraction pattern 136 referred to a coordinate system passing through scattering point 138 is given as follows:

$$x^2 = v^2(t_x t_d + t_d^2) \quad (3)$$

where $t_x$ is the two-way time to the apex of diffraction pattern 136 as observed on the section, and $t_d$ is the additional two-way time to a point on the diffraction pattern a distance x from the apex. If $t_d$ is small relative to $t_{x'}$, which is true for scatterers at considerable depth, the diffraction pattern 136 approximates a parabola.

Referred to a more useful coordinate system passing through a surface point 148 above scatterer 138, the equation of the diffraction pattern 136 is as follows:

$$t_0 = t_x - \frac{x^2}{t_x v^2} \quad (4)$$

where $t_0$ is the vertical two-way time from the origin of coordinates 148 to the apex 138, and $t_x$ is the two-way time of the diffraction event on the simulated trace at receiver 144 a distance x from surface point 148. This latter equation of the diffraction pattern has the same general form as equation (2) for migration by the common tangent method, except that the origin of the x coordinate is, in general, different.

Figure 11:
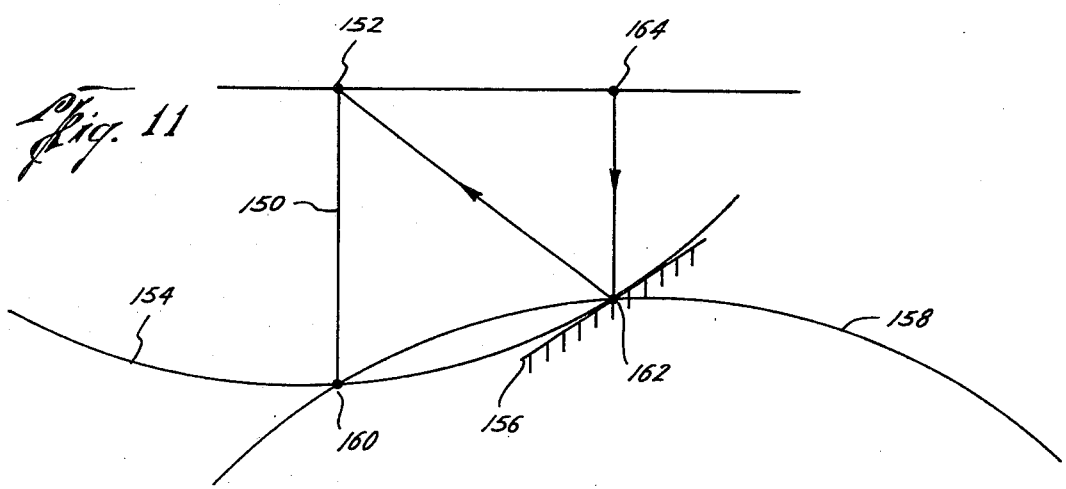
FIG. 11 illustrates the duality between the two migration methods implicit in FIGS. 9 and 10.

The relation between the common tangent and diffraction approaches to migration according to the present invention can be seen with reference to FIG. 11. A reflection appearing at a time 150 on simulated trace 52 assigned to a surface point 152 as displayed on an unmigrated section comes from a reflection point somewhere along a parabola 154. An element 156 of the reflector, viewed as a point scatterer, generates diffracted arrivals on simulated traces 52 assigned to all surface points. These arrivals, on the unmigrated section, follow a curve 158 which approximates to a parabola at depth. The effect of two dimensional common tangent migration is to move the reflection indication from its unmigrated position 160 to its migrated position 162 along parabola 154 by summing, in a conventional manner, all simulated traces 52 distributed along curve 154. In the position 162, the migrated signal is reinforced by migrated signals obtained from the simulated traces assigned to surface points between receiver position 152 and a surface point 164 vertically above the reflection point 162. The effect of two dimensional diffraction migration is to include the reflection indication 160 in the migrated signal plotted under a surface point 164 by summation, in a conventional manner, of all simulated traces 52 distributed along diffraction curve 158. Similarly, three dimensional migration is carried out by summing traces 52 over a paraboloid corresponding to either curve 154 or curve 158.

Figure 12:
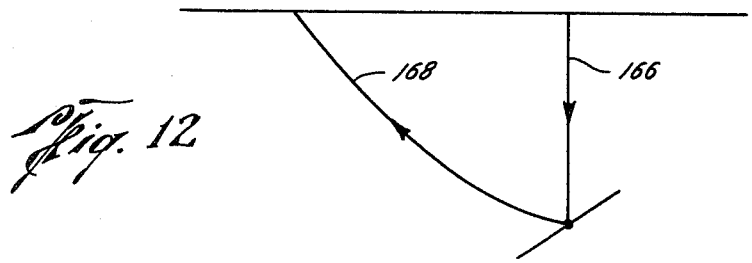
FIG. 12 illustrates a downgoing ray path representing substantially an average velocity and an upcoming ray path representing substantially an r.m.s. velocity.

The above discussion of migration is, of course, oversimplified because in the real earth velocities are a function of depth. When this factor is considered, the equations given above must be modified to include velocity variation, and the surfaces they represent become more curved. The type of velocity variation is illustrated in FIG. 12 where the velocity along a downgoing ray path 166 always approximates very closely the average velocity, and the velocity on an upcoming ray path 168 approximates very closely the r.m.s. velocity. The knowledge that one component of the path 166 is always vertical is of major benefit in the solution of velocity problems.

The same knowledge is also of benefit in detailed matters of migration because it is known that the substantially vertical path 94 (FIG. 2) implied by a time migrated section is a real ray path 166 in the present method. With known seismic exploration methods, path 94 was entirely notional. Accordingly, the amplitudes of migrated signals obtained according to the methods of the present invention are generally more reliable than those obtained by traditional migration signal processing in known seismic exploration methods.

Several other advantages are associated with the substantial verticality of one component 166 of the reflection path. These include the certainty that multiple reflections and reverberations generated between horizontal interfaces retain constant periodicity on that component of the path, and the certainty that paths through near surface layers, in particular permafrost layers, are vertical.

With known seismic exploration methods, stacking velocities were computed from common-depth-point gathers, and average velocities and migration velocities were computed from these. This possibility is still open with the method of the present invention. However, the method of the present invention includes a novel method for computing velocities.

Figure 13A:
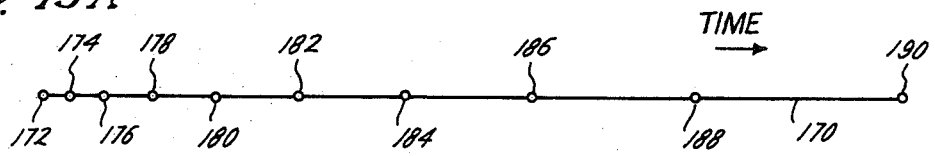
FIG. 13A illustrates a plot of normal moveout times along a time axis and FIG. 13B illustrates impulses at the moveout times on the axis of FIG. 13A to form a velocity correlation signal by use of which velocities may be derived from simulated cylindrical wave signals.

For the zero dip reflection situation illustrated in FIG. 6A, the curve 46 of FIG. 6B is a hyperbola symmetrical about the center trace 38. The normal moveout for this symmetrical hyperbola 46 as a function of source-receiver distance, and therefore as a function of trace number across the suite of traces represented by traces 36, 38, and 40, can be computed from any given velocity by well known techniques. If the normal moveout times for the known source-receiver distances are plotted along a common time axis 170 (FIG. 13A), they appear as points 172–190. Point 172 represents the normal-incidence reflection time on trace 38, and the other points represent reflection times at progressively greater source-receiver distances. Since the hyperbola 46 is symmetrical about trace 10 in FIG. 6A, there are two recorded signals corresponding to each normal moveout point in FIG. 13A. Thus, if the field arrangement of the receiver spread has 48 receiver arrays symmetrically on each side of the source, there are 48 points along time axis 170.

Figure 13B:
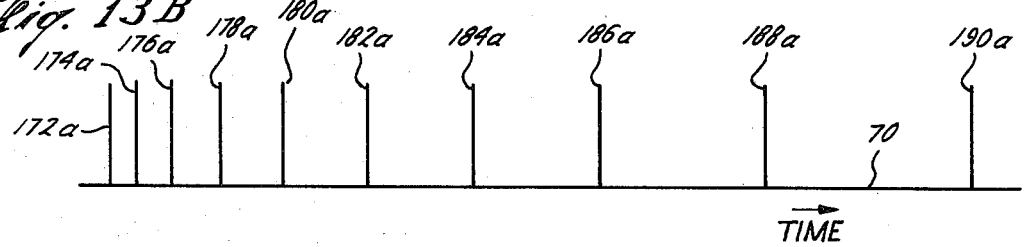

As shown in FIG. 13B, a plurality of spikes 172a–190a may be erected along time axis 170. Each such spike corresponds to one of the points 172–190 on time axis 170 shown in FIG. 13A. The spikes 172a–190a give a time waveform which is used as a velocity correlation signal. Since combined trace 52 is formed by adding the suite of traces typified by traces 36, 38, and 40, the combined trace 52 contains within it reflection pulses whose time relationship relative to the reflection pulse on trace 38 conforms exactly to the pattern of spikes 172a–190a. Therefore, if the velocity correlation signal illustrated in FIG. 13B is correlated against trace 52, a large value of correlation coefficient is obtained providing that the velocity used in computing the normal moveout is appropriate. Thus, a search may be conducted to find the velocity value which produces the maximum correlation coefficient at every reflection time. Such a method of identifying the velocity which yields the maximum correlation coefficient is practical when the number of receiver arrays used in spread 24 is large so that the number of spikes typified by 172a–190a is large. This is the case in current seismic exploration practice. The correlation coefficient obtained at the correct time and velocity is, therefore, many times larger than that inevitably obtained by spurious correlations between the individual spikes and the reflection pulses which are not matched.

In determining velocity according to the method of the present invention, it may also be desirable to use spikes having unequal amplitudes or to erect a pulse of a reflection type in the place of each spike. The use of a pulse of the reflection type, such as one estimated from the reflection data, has the advantage of discriminating against noise. When pulses of the reflection type are used, full correlation between the traces 52 and the velocity correlation signal is desirable. Spikes of unequal amplitudes, such as spikes having lower amplitudes at smaller values of normal moveout may be utilized to emphasize the reflection outputs of traces such as 36a and 40a lying at the outer edges of the normal moveout curve 46. These outer traces present a valuable information concerning velocity making it desirable in some instances to emphasize such traces.

As noted above, spreads utilized with the method of the present invention preferably have arrays which are substantially contiguous so that the geophones or hydrophones are distributed uniformly along the spread. However, this is somewhat incompatible for the velocity determination method described above since the summation by which traces 52 are obtained tends to reduce the contribution from the outer traces such as 36 and 40 upon which a velocity measurement is dependent. Therefore, the velocity determination of the present invention is best practiced on some traces 52 which do not represent all possible traces of the suite of traces typified by traces 36, 38 and 40. For example, the velocity determination utilizing a symmetrical spread may first be carried out with all the odd traces on one side of the source and all the even traces on the other. Then the determination is repeated using all of the remaining traces. In this way, two independent measurements are available for averaging, each of which represents an alternating sequence of arrays and gaps. Thus, for velocity determination, the use of less than all of the traces from the receivers maintains a contribution to the velocity determination from the outer traces such as 36 and 40.

While the above discussion of velocity determination applied to the zero dip situation illustrated in FIG. 6A, the same technique may be used for calculating velocities when dip is allowed. When dip is allowed, the normal moveout hyperbola is shifted both horizontally and vertically from the position it would occupy if no dip were allowed. However, the normal moveout curve maintains the same hyperbolic form. A particular advantage of the velocity determination using the method of the present invention is that the resulting velocity measurement is the true r.m.s. velocity. It is not dependent upon dip. With traditional methods, the curve fitting velocity determination techniques required that an assumption be made as to the position of apex 54 of the normal moveout curve 46. When the assumption as to the position of the apex 54 was in error, the r.m.s. velocity measured by traditional methods was also in error. With the method of the present invention, summation of the traces to form the combined trace 52 is not dependent upon any particular position of the apex 54 of the normal moveout curve 46. Accordingly, the r.m.s. velocity measured according to the method of the present invention is not related to the dip dependent position of the apex 54 of the normal moveout curve.

Figure 14:
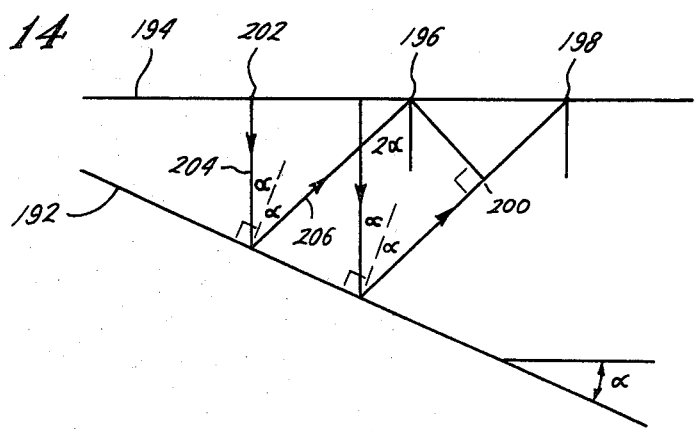
FIG. 14 illustrates the dip relationships associated with a simulated plane wave.

The method of the present invention does, however, have advantageous features concerning the measurement of dip. A plane wave reflected from a plane reflector 192 (FIG. 14) remains plane and emerges at an upper surface 194 in this form. The usual relationship between the dip angle $\alpha$, the velocity, and the emergence angle, which may be obtained from a solution of the triangle formed by the lines between receiver positions 196 and 198 and a third position 200, is exact for the method of the present invention. With known seismic exploration methods using spherical waves, this relationship was an approximation. The emergence angle $2\alpha$ is twice the dip angle $\alpha$ for a constant velocity. If the total two-way travel time from an effective source 202 to reflector 192 and on to an effective receiver at 196 is t, a vertical downward part of the ray path 204 occupies a one-way travel time of $$\tfrac{1}{2}t\,(1-\tan^2\alpha) \qquad (5)$$

and the inclined upward part of the path 206 occupies a one-way travel time given by $$\tfrac{1}{2}t\,(1+\tan^2\alpha) \qquad (6)$$

A measurement of the time gradient of a reflection on the simulated trace section formed by a plurality of traces 52 may be used to weight the distribution of seismic data during migration to minimize the effect of distribution of reflection signals into zones where the reflector dip is sufficiently steep to preclude detection of a reflection in those zones.

The method of the present invention further includes a method by which reflection signals from steep dips may also be detected. Time shifts may be applied to the original traces such as 36, 38, and 40. The time shifts increase progressively away from the simulated trace position, positively in one direction and negatively in the other. By applying such time shifts to the original traces, a downgoing plane or cylindrical wavefront inclined to the horizontal is simulated. The wavefront may be inclined to be parallel to the dipping reflector. When it is parallel to the dipping reflector, the emergence angle is equal to the dip angle, and the entry angle is the complement of the dip angle. To accomplish migration when neither part of the ray path is vertical, more complicated migration techniques such as those described in U.S. Patent Application Ser. No. 519,347, filed Oct. 30, 1974, and assigned to the assignee of the present invention, are used.

Figure 15:
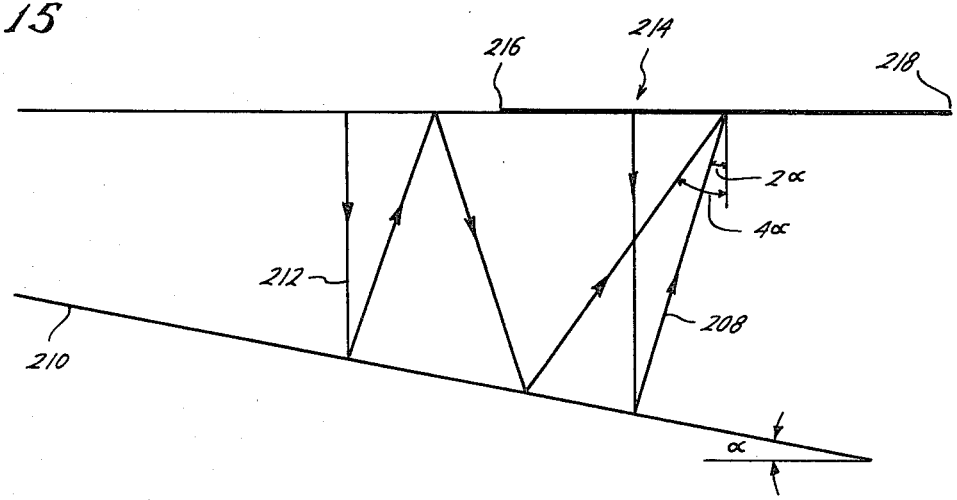
FIG. 15 illustrates a representative multiple reflection path associated with a dipping reflector.

An additional feature of the present invention concerning dip should also be noted. When horizontal wavefronts are employed with the present invention, multiple reflections are not observed when the associated primary reflections have more than half the maximum dip allowed by the receiver spread length. In FIG. 15, a primary reflection 208 from a dipping reflector 210 is illustrated along with a corresponding first multiple reflection 212 from the same reflector 210. A spread 214 of receivers extends from surface position 216 to surface position 218. For the purposes of explanation, it is assumed that the maximum allowable dip for the length of spread 214 is $3\alpha$. The apparent dip of multiple reflection 212 is double that of the primary reflection 208. Accordingly, if the primary reflection 208 has a dip of $2\alpha$, the multiple reflection 212 will have a dip of $4\alpha$. However, the multiple reflection having this great a dip will not be detected by spread 214 because the multiple has an apparent dip which exceeds the maximum dip allowed by spread 214.

It is true, however, that multiples from horizontal or near horizontal reflectors are apparent in the traces derived by the method of the present invention. However, these multiples from horizontal or near horizontal reflectors are multiples whose period is substantially constant. Because of this constant period, these multiples are amenable to treatment by subtractive techniques. Particularly useful in eliminating such multiples are the known predictive dereverberation methods, sophisticated forms of the basic 3-point dereverberation method, and a recursive or feed-back method using the algorithm:

$$g_j = \sum_{k=1}^{j} g_{j-k} \cdot f_k \qquad (7)$$

where $f_j$ equals the untreated trace, $g_j$ equals the treated trace, and $g_0$ equals a nonzero constant.

Since the need for multiple suppression and the manner of accomplishing it depend on the present or absence of dip, the method of the present invention may be adapted by filtering or other means so that the time migrated section derived by the present invention is divided into its dipping and its nondipping part. Then the appropriate form of multiple suppression is applied to the substantially nondipping part, and the two parts are recombined.

The above discussion of the present invention is largely in terms of ray paths. In fact, of course, horizontal plane or cylindrical wave fronts implied by such ray paths exist only over an extent comparable to the length of the spread. At the ends of the spread, the wavefronts become curved. The contribution from the sources and/or receivers at the ends of the spread may be tapered down in order that the simulation of the plane or cylindrical waves is more accurate.

It should be further noted that the distribution of receivers along the spread is preferably regular to reduce the contributions to the summed traces 52 from refracted signals 42 (FIG. 6B) and from surface waves. When the distribution of the receivers along the spread is substantially contiguous, the spread approximates a single array and is, therefore, relatively insensitive to surface waves or refracted signals having substantially regular velocities However, if it is found that the surface waves or refracted signals are contributing substantially to the summed traces, these surface waves and refracted signals may be muted or filtered out of the traces as with known seismic exploration methods.

Figure 16:
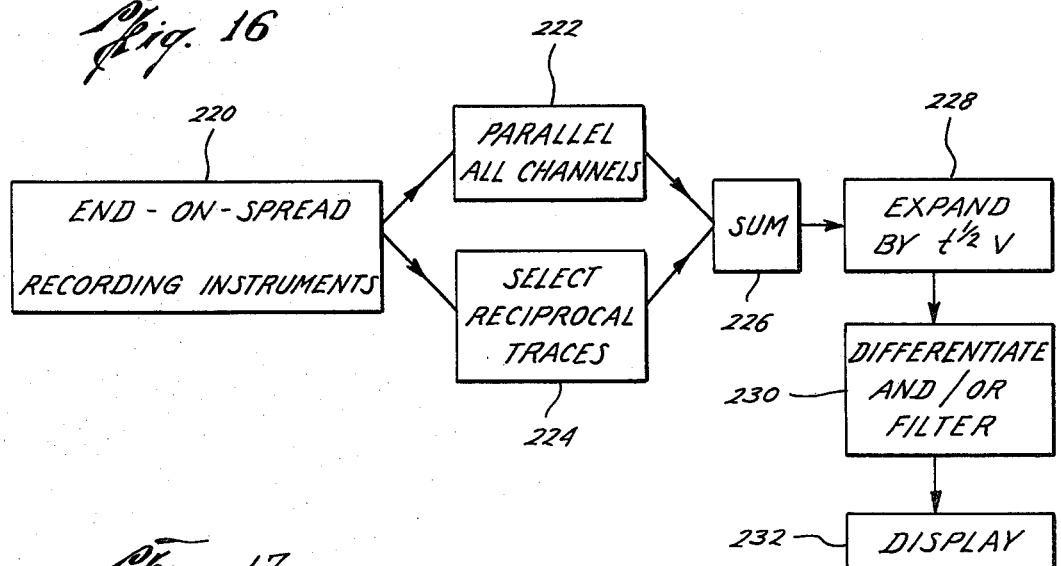
FIG. 16 illustrates, in block diagram form, an implementation of the present invention particularly adapted to producing an improved cross-section on board a survey vessel.

FIG. 16 is a functional block diagram of one implementation of the method of the present invention particularly adapted as an improved monitor section on a marine survey vessel. Block 220 indicates generally the usual end-on spread apparatus, preferably including receiver arrays close to the source, and conventional recording instruments for recording the reflected seismic signals. The recording instruments include a conventional recording means for recording as a separate channel the signals generated by each receiver array. Preferably, the receiver arrays are 48 or 96 in number. The output from the recording instruments is divided in two ways. In state 222, all of the channels are summed to give a single combined trace. This is equivalent to summing the signals from receiver positions 60-68 in the spread arrangement illustrated in FIG. 8. In another stage 224, the reciprocal paths for the seismic waves are selected and summed. This process is equivalent to taking signals such as those typified by the source 72 into receiver 64a of the spread illustrated in FIG. 8 and summing all such traces in the spread. Then the summed signals from stages 222 and 224 are summed in stage 226 to give a single summed trace 52. This step corresponds to summing the left hand and right hand halves of the traces in FIG. 6B. The summed trace from stage 226 is next amplitude compensated in stage 228. Preferably, the summed trace from stage 226 is expanding by the function $\sqrt{t}$. Next, in stage 230, the expanded combined trace is differentiated and/or filtered prior to being displayed in stage 232. The final display from stage 232 provides one summed trace 52 of a simulated cylindrical wave type for each source position associated with the spread.

Figure 17:
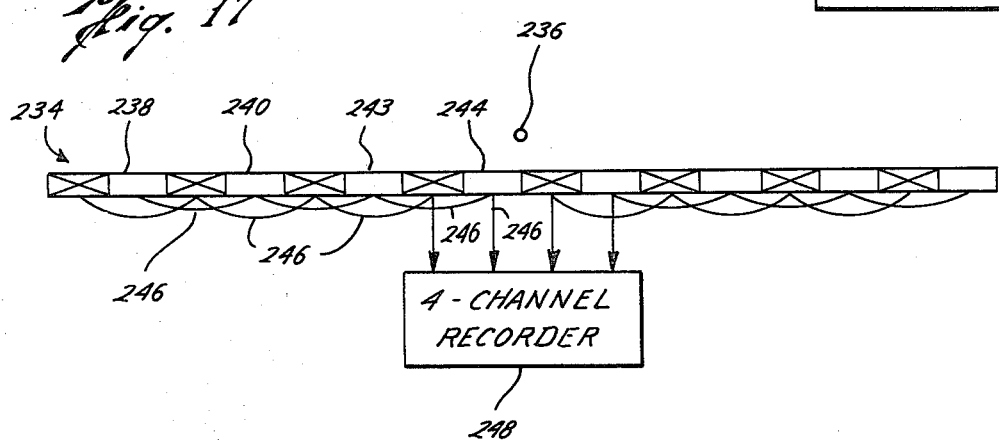
FIG. 17 shows an arrangement by which data is obtained in the field using only four recording channels.

FIG. 17 illustrates another implementation of the method of the present invention particularly adapted for use in split-spread operations on land. A spread 234 is disposed symmetrically about a source 236. For the sake of clarity, only 16 receivers arrays are illustrated in FIG. 17, although, in practice, the number of receiver arrays used might be 48 or 96. The arrays illustrated in FIG. 17 are contiguous. The individual geophones may be disposed at regular intervals along the spread 234, and each array represents the connection into a single output of all the geophones within an extent of perhaps 50 or 100 meters. In the particular illustration shown in FIG. 17, each geophone cable has only two pairs of conductors. Arrays 238, 240, 242, and 244, for example, are all connected to a single pair of conductors 246 and connected to a recorder 248. The remaining receivers in spread 234 are similarly divided into three additional groups, each of which is connected to recorder 248 by a single pair of conductors. This approach allows the complete spread 234 to be recorded on just four channels, as opposed to the 48 channels or 96 channels often required with known seismic exploration methods.

In subsequent signal processing, the four recorded signals from recorder 248 may be used in different manners for different objectives. All four signals may be summed directly to give the trace 52 of FIG. 6B. The sum of the four signals from the recorder may be used for the determination of velocities by correlation with a velocity correlation signal as described in the discussion of FIG. 13. Additionally, the sum of two of the channels from the recorder may be summed and used to obtain an independent velocity determination which can then be averaged with the first velocity determination using all four channels.

The arrangement illustrated in FIG. 17 represents, of course, a major advance in field recording. The spread cables may be much lighter, the recording instruments are much reduced in complexity, and both the equipment and the magnetic recording tapes are much decreased in cost.

Of course, recording arrangements other than those illustrated in FIGS. 16 and 17 may be used without departing from the spirit or scope of the present invention. For example, when the method of the present invention is used with a conventional swept frequency vibratory seismic source, signal processing may proceed through the preparation of simulated trace 52 before the operation of correlation is required. This feature represents a major economy in signal processing because of the significant reduction in the volume of data which must be handled in the signal processing procedures. In short, advantages of utilizing the method of the present invention may be realized in a large number of applications.

The foregoing disclosure and description of the invention are illustrative and explanatory thereof, and various changes in the size, shape, and materials as well as in the details of the illustrated construction may be made without departing from the spirit of the invention.

We claim:

1. A method of seismic exploration by simulating from substantially spherical seismic waves the reflection response of the earth to seismic energy having a substantially continuous wavefront over an extent of an area being explored having at least one dimension which is large relative to a seismic wavelength, comprising the steps of:
   (a) imparting the spherical seismic energy waves into the earth from a seismic source at a source position;
   (b) generating a plurality of reflection signals in response to the seismic energy waves at a set of receiver positions spaced in an array over an extent having at least one dimension which is large relative to a seismic wavelength; and
   (c) summing the reflection signals to form for the source position a signal simulating the reflection response of the earth to seismic energy having a substantially continuous wavefront over at least one dimension which is large relative to a seismic energy wavelength.

2. The method set forth in claim 1, further including the step of:
   recording said summed signal.

3. The method set forth in claim 1, further including the step of:
   amplitude weighting the reflection signals with respect to one another prior to said step of summing.

4. The method set forth in claim 1, further including the step of:
   filtering the reflection signals prior to said step of summing.

5. The method set forth in claim 1, wherein a travel time equal to the time between impartation of seismic energy into the earth at the source position and reception of seismic energy at the set of receiver positions is associated with each of the reflection signals and further including the step of:
   muting the reflection signals occurring before selected travel times prior to said step of summing.

6. The method set forth in claim 1, wherein a travel time equal to the time between impartation of seismic energy into the earth at the source position and reception of seismic energy at the set of receiver positions is associated with each of the reflection signals and further including the step of:
   muting the reflection signals occurring after selected travel times prior to said step of summing.

7. The method set forth in claim 1, further including the step of:
   shifting the reflected signals in time with respect to one another prior to said step of summing.

8. The method set forth in claim 1, further including the steps of:
   (a) successively imparting spherical seismic energy waves into the earth from each of a set of source positions;
   (b) generating a set of reflection signals in response to seismic energy received at the set of receiver positions from each successive impartation of seismic energy waves from each of the set of source positions; and
   (c) summing each set of reflection signals to form a signal for each source position simulating reflection response of the earth to seismic energy having a substantially continuous wavefront over at least one dimension which is large relative to a seismic energy wavelength.

9. The method set forth in claim 1, wherein seismic energy wave velocities, travel times, and source-receiver distances are associated with the reflection signals and the signal formed for the source position, and further including the steps of:
   (a) calculating the normal moveout values for each of a range of velocities and travel times for each source-receiver distance represented in the signal formed for the source position;
   (b) constructing a velocity correlation signal for the normal moveout values calculated; and
   (c) computing the correlation coefficient between said velocity correlation signal and the signal, whereby the velocity which yields the maximum correlation coefficient is identifiable.

10. The method set forth in claim 9, wherein said step of constructing a velocity correlation signal includes:
    erecting a spike at each calculated value of normal movement.

11. The method set forth in claim 9, wherein said step of constructing a velocity correlation signal includes:
    erecting a pulse at each calculated value of normal movement.

12. The method set forth in claim 1, further including the step of:
    migrating the reflection signals prior to said step of summing.

13. The method set forth in claim 12, wherein:
    (a) said step of migrating includes distributing a plurality of the reflection signals over a curve of substantially parabolic form; and
    (b) said step of summing comprises summing the distributed reflection signals over the parabolic curve.

14. The method set forth in claim 12, wherein:
    (a) said step of migrating includes distributing a plurality of the reflection signals over a curve of substantially paraboloidal form; and
    (b) said step of summing comprises summing the distributed reflection signals over the paraboloidal curve.

15. The method set forth in claim 1, wherein:
the receivers are spaced evenly along the set of receiver positions, whereby said plurality of receivers approximate a single, effectively continuous receiver having an extent which is large relative to a seismic energy wavelength.

16. A method of seismic exploration by simulating from substantially spherical seismic waves the reflection response of the earth to seismic energy having a substantially continuous wavefront over an extent of an area being explored having at least one dimension which is large relative to a seismic wavelength, comprising the steps of:
   (a) imparting the spherical seismic energy waves into the earth from a set of seismic sources at source positions spaced in an array over an extent having at least one dimension which is large relative to a seismic wavelength;
   (b) generating a reflection signal at a receiver position in response to each of the seismic energy waves; and
   (c) summing the reflection signals to form for the receiver position a signal simulating the reflection response of the earth to seismic energy having a substantially continuous wavefront over at least one dimension which is large relative to a seismic energy wavelength.

17. The method set forth in claim 16, further including the step of:
recording said summed signal.

18. The method set forth in claim 16, further including the step of:
amplitude weighting the reflection signals with respect to one another.

19. The method set forth in claim 16, further including the step of:
filtering the reflection signals prior to said step of summing.

20. The method set forth in claim 16, wherein a travel time equal to the time between impartation of seismic energy into the earth at the source positions and reception of seismic energy at the receiver position is associated with each of the reflection signals and further including the step of:
muting the reflection signals occurring before selected travel times prior to said step of summing.

21. The method set forth in claim 16, wherein a travel time equal to the time between impartation of seismic energy into the earth at the source positions and reception of seismic energy at the receiver position is associated with each of the reflection signals and further including the step of:
muting the reflection signals occurring after selected travel times prior to said step of summing.

22. The method set forth in claim 16, further including the step of:
shifting the reflected signals in time with respect to one another prior to said step of summing.

23. The method set forth in claim 16, further including the steps of:
   (a) successively imparting spherical seismic energy waves into the earth from the plural sets of source positions;
   (b) generating a set of reflection signals in response to seismic energy received at each of a set of receiver positions from each successive impartation of seismic energy waves from each of the plural sets of source positions; and
   (c) summing each set of reflection signals to form a signal for each of the set of receiver positions simulating reflection response of the earth to seismic energy having a substantially continuous wavefront over at least one dimension which is large relative to a seismic energy wavelength.

24. The method set forth in claim 16, wherein seismic energy wave velocities, travel times, and source-receiver distances are associated with the reflection signals and the signal formed for the source position, and further including the steps of:
   (a) calculating the normal moveout values for each of a range of velocities and travel times for each source-receiver distance represented in the signal formed for the source position;
   (b) constructing a velocity correlation signal for the normal moveout values calculated; and
   (c) computing the correlation coefficient between said velocity correlation signal and the signal, whereby the velocity which yields the maximum correlation coefficient is identifiable.

25. The method set forth in claim 16, further including the step of:
migrating the reflection signals prior to said step of summing.

26. The method set forth in claim 25, wherein:
   (a) said step of migrating includes distributing a plurality of the reflection signals over a curve of substantially parabolic form; and
   (b) said step of summing comprises summing the distributed reflection signals over the parabolic curve.

27. The method set forth in claim 25, wherein said step of migration includes:
   (a) distributing a plurality of said combined signals over a curve of substantially paraboloidal form; and
   (b) summing said distributed signals over said paraboloidal curve.

28. The method set forth in claim 16, wherein:
the sources are spaced evenly along the set of source positions, whereby said plurality of sources approximate a single, effectively continuous source having an extent which is large relative to a seismic energy wavelength.

* * * * *